US008386794B2

(12) United States Patent
Kang et al.

(10) Patent No.: US 8,386,794 B2
(45) Date of Patent: Feb. 26, 2013

(54) APPARATUS AND METHOD FOR PROTECTING RFID DATA

(75) Inventors: You-Sung Kang, Seoul (KR); Ho-Won Kim, Daejeon (KR); Kyo-Il Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 718 days.

(21) Appl. No.: 12/518,041

(22) PCT Filed: Aug. 24, 2007

(86) PCT No.: PCT/KR2007/004060
§ 371 (c)(1),
(2), (4) Date: Jun. 5, 2009

(87) PCT Pub. No.: WO2008/069403
PCT Pub. Date: Jun. 12, 2008

(65) Prior Publication Data
US 2011/0041046 A1    Feb. 17, 2011

(30) Foreign Application Priority Data

Dec. 5, 2006  (KR) ........................ 10-2006-0122643

(51) Int. Cl.
H04L 29/06      (2006.01)
(52) U.S. Cl. ........................ 713/181; 380/270
(58) Field of Classification Search .................. 713/181;
380/270; 714/807, E11.032; 707/698, 699
See application file for complete search history.

(56) References Cited

U.S. PATENT DOCUMENTS

| 2004/0123102 | A1* | 6/2004 | Gehrmann et al. | 713/161 |
|---|---|---|---|---|
| 2005/0123133 | A1 | 6/2005 | Stewart et al. | |
| 2005/0226240 | A1* | 10/2005 | Hoffmann et al. | 370/389 |
| 2006/0098820 | A1* | 5/2006 | Chang et al. | 380/46 |
| 2006/0282675 | A1* | 12/2006 | Yao | 713/176 |
| 2006/0294386 | A1* | 12/2006 | Yuval et al. | 713/181 |
| 2008/0068137 | A1* | 3/2008 | Kang et al. | 340/10.5 |

FOREIGN PATENT DOCUMENTS

| KR | 10-2005-0014590 | 2/2005 |
|---|---|---|
| KR | 10-2006-0007573 | 1/2006 |
| KR | 10-2006-0028952 | 4/2006 |
| KR | 10-2006-0082115 | 7/2006 |
| KR | 10-2007-0061006 | 6/2007 |

OTHER PUBLICATIONS

You Sung Kang, et al., "Design of Lightweight Security Protocol for Electronic Seal Data Protection," The 7th International Workshop on Information Security Applications, Ramada Plaza Jeju Hotel, Jeju Island, Korea, Aug. 28-30, 2006, pp. 517-531.
International Search Report (Form PCT/ISA/210) for International Application No. PCT/KR2007/004060, mailed Nov. 30, 2007.

* cited by examiner

Primary Examiner — Hadi Armouche
(74) Attorney, Agent, or Firm — Staas & Halsey LLP

(57) ABSTRACT

An apparatus and method for protecting radio frequency identification (RFID) data in a communication between a RFID tag and a RFID reader are provided. In the apparatus and method for protecting RFID data, message header information transmitted while communicating the RFID tag and the RFID reader is used to perform an encryption operation for important data, thereby protecting the important data included in the RFID tag. In the present invention, information of the RFID tag can be protected from an illegitimate eavesdropper and an ill-intentioned and unusual message can be detected, thereby ensuring the security of a RFID system.

17 Claims, 9 Drawing Sheets

FIG. 3

WRITING OPERATION REQUEST (300)

| WRITING OPERATION REQUEST MESSAGE HEADER (301) | | | WRITING OPERATION REQUEST MESSAGE TEXT (302) | | | |
|---|---|---|---|---|---|---|
| TAG MANUFACTURER ID | TAG SERIAL NUMBER | READER ID | RANDOM NUMBER | DIGITAL SIGNATURE VALUE | WRITING INFORMATION | MESSAGE INTEGRITY CODE |
| 2 BYTES (303) | 4 BYTES (304) | 2 BYTES (305) | 8 BYTES (306) | 42 BYTES (307) | N BYTES (308) | 8 BYTES (309) |

| WRITING OPERATION RESPONSE MESSAGE HEADER (310) | | | WRITING OPERATION RESPONSE MESSAGE TEXT (311) | | |
|---|---|---|---|---|---|
| TAG MANUFACTURER ID | TAG SERIAL NUMBER | READER ID | RANDOM NUMBER | STORING LOCATION INFORMATION | MESSAGE INTEGRITY CODE |
| 2 BYTES (312) | 4 BYTES (313) | 2 BYTES (314) | 8 BYTES (315) | 4 BYTES (316) | 8 BYTES (317) |

FIG. 5

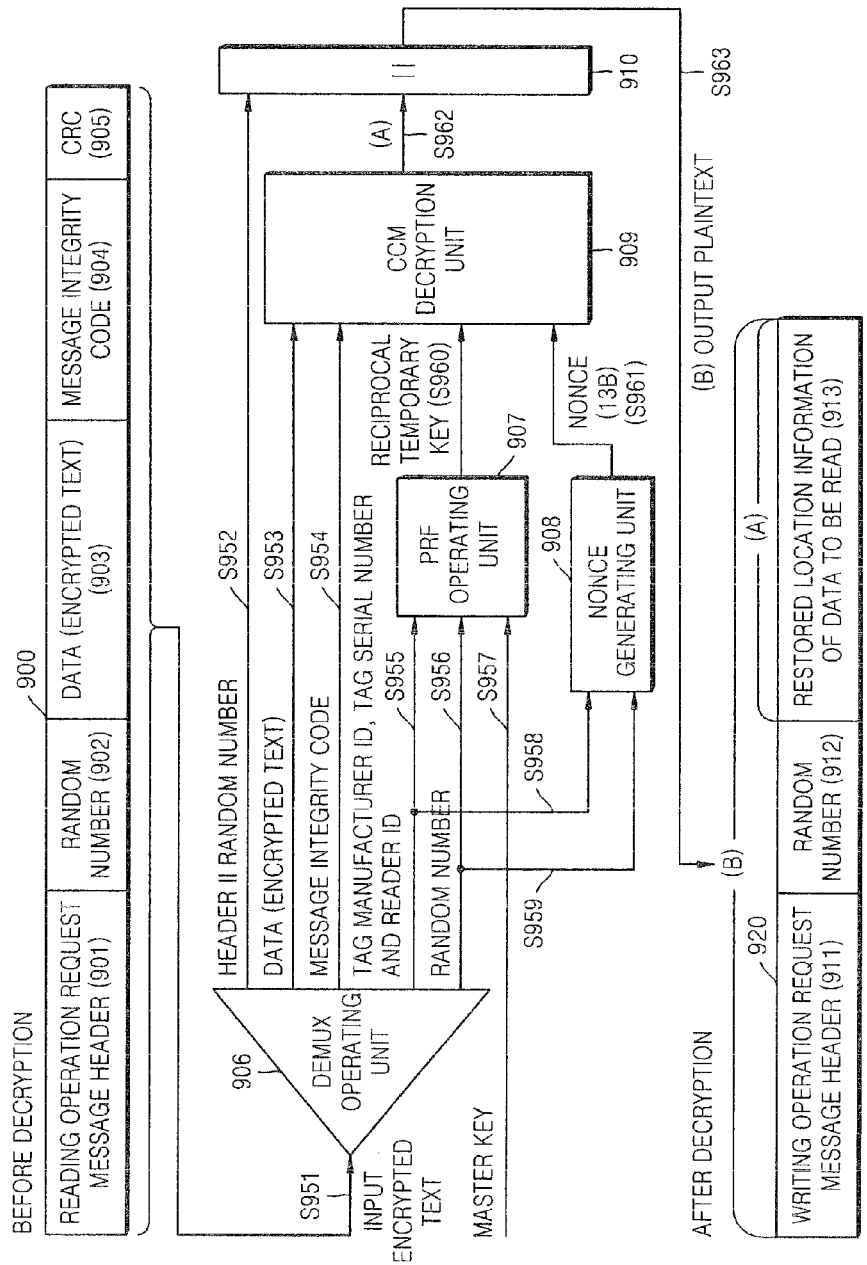

US 8,386,794 B2

APPARATUS AND METHOD FOR PROTECTING RFID DATA

CROSS-REFERENCE TO RELATED PATENT APPLICATION

This application claims the benefit under 35 U.S.C. Section 371, of PCT International Application No. PCT/KR2007/004060, filed Aug. 24, 2007, which claimed priority to Korean Patent Application No. 10-2006-0122643, filed on Dec. 5, 2006, in the Korean Intellectual Property Office, the disclosures of which are hereby incorporated by reference.

BACKGROUND OF THE INVENTION

1. Field of the Invention

The present invention relates to an apparatus and method for protecting radio frequency identification (RFID) data, and more particularly, to an apparatus and method for protecting RFID data in which a RFID reader encrypts a request message so as to transmit the encrypted message to a RFID tag and the RFID tag encrypts a response message so as to reply to the RFID reader so that information of the RFID tag can be protected from an illegitimate eavesdropper and an ill-intentioned and unusual message can be detected.

2. Description of the Related Art

A conventional radio frequency identification (RFID) system includes a RFID tag, a RFID reader, and a RFID application server.

The RFID tag and the RFID reader are wireless communication devices and the international standard for a wireless access of the RFID tag and the RFID reader is defined in ISO/IEC 18000. The international standards of the conventional RFID wireless access define parameters of physical layers based on frequency characteristics and a command-response structure communicated between the RFID tag and the RFID reader.

Thus, the RFID reader must conform to a message form defined by the international standard ISO/IEC 18000 in order to read or write an identifier or information stored in the RFID tag.

However, the conventional international standard ISO/IEC 18000 does not define an authentication and a data protection for the RFID tag and the RFID reader. Accordingly, if an ill-intentioned attacker only conforms to the parameters of the physical layers and the command-response structure defined in the international standard ISO/IEC 18000, RFID tag information can be revealed through an illegal eavesdropping or the RFID system can be paralyzed due to an excessive command. Thus, security problems may occur.

An illegal eavesdropping or system rejection due to an excessive command message can be prevented by using a conventional symmetric key encryption/decryption and or a conventional public key encryption/decryption.

However, since the RFID tag has low operation ability, small memory capacity, and low data transmission capability, the conventional network security technology is rarely applied.

Therefore, security protocol which can conform to the RFID international standard and can be applied to the RFID tag and the RFID reader is required.

SUMMARY OF THE INVENTION

The present invention provides an apparatus and method for protecting radio frequency identification (RFID) data which encrypts data communicated between a RFID tag and a RFID reader so as not to allow the RFID data to be stolen by an illegitimate eavesdropper.

The present invention also provides an apparatus and a streamlined method for protecting RFID data which can conform to the RFID international standard and can be applied to the RFID tag and the RFID reader.

According to an aspect of the present invention, there is provided An apparatus for protecting radio frequency identification (RFID) data including: a Demux operating unit which receives a message header formed of serial bit strings, a random number, and data and outputs the message header, the random number, and the data by dividing the message header, the random number, and the data into predetermined bit lengths; a CCM decryption unit which uses the random number to encrypt or decrypt the data according to a predetermined technology and generates or inspects a message integrity code in order to check an error occurrence in encrypted or decrypted data; and a concatenation block which concatenates the encrypted or decrypted data with the message header, the random number, and the message integrity code to output the encrypted or decrypted data, the message header, the random number, and the message integrity code as serial bit strings.

According to another aspect of the present invention, there is provided method of protecting radio frequency identification (RFID) data including: receiving a message header formed of serial bit strings, a random number, and data and outputting the message header, the random number, and the data by dividing the message header, the random number, and the data into predetermined bit lengths; encrypting or decrypting the data according to a predetermined technology and generating or inspecting a message integrity code in order to check an error occurrence in the encrypted or decrypted data; and concatenating the encrypted or decrypted data with the message header, the random number, and the message integrity code to output the encrypted or decrypted data, the message header, the random number, and the data as serial bit strings.

BRIEF DESCRIPTION OF THE DRAWINGS

The above and other features and advantages of the present invention will become more apparent by describing in detail exemplary embodiments thereof with reference to the attached drawings in which:

FIG. 3 is a diagram of a request-response packet transmitted during a data writing operation according to an embodiment of the present invention;

FIG. 5 is a diagram of a decryption operation of a request message transmitted during a data writing operation according to an embodiment of the present invention;

FIG. 9 is a diagram of a decryption operation of a request message transmitted during a data reading operation according to an embodiment of the present invention.

DETAILED DESCRIPTION OF THE INVENTION

Hereinafter, the present invention will be described more fully with reference to the accompanying drawings, in which exemplary embodiments of the invention are shown.

Figure 1:
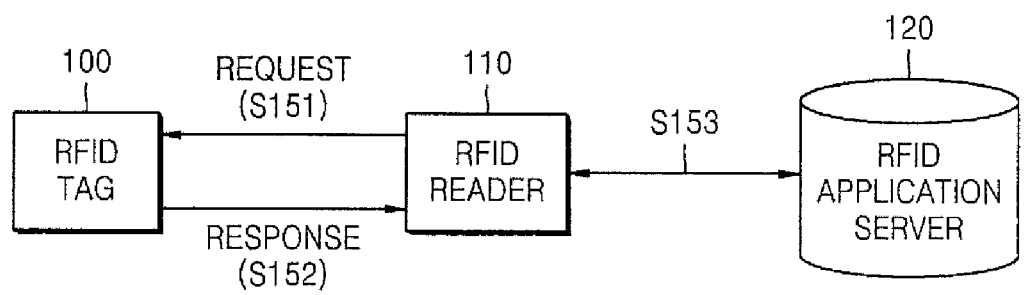
FIG. 1 illustrates a conventional RFID system.

FIG. 1 illustrates a conventional RFID system.

In the RFID system, when a RFID reader 110 sends a request for an identifier or internal information to a RFID tag 100 in operation S151 and the RFID tag 100 responds thereto in operation S152, the RFID reader 110 communicates with a RFID application server 120 to obtain the additional information in operation S153.

During any one of such operations, if a plain text transmission is accomplished without applying a security technology, eavesdropping from an illegal attacker may occur or a message can be damaged.

In particular, the international standard for a RFID physical layer and a communication protocol does not consider protection of data between the RFID tag 100 and the RFID reader 110 and thus the communications in operations S151 and S152 between the RFID tag 100 and the RFID reader 110 are exposed to eavesdropping and damage of a message without any form of defense.

Figure 2:
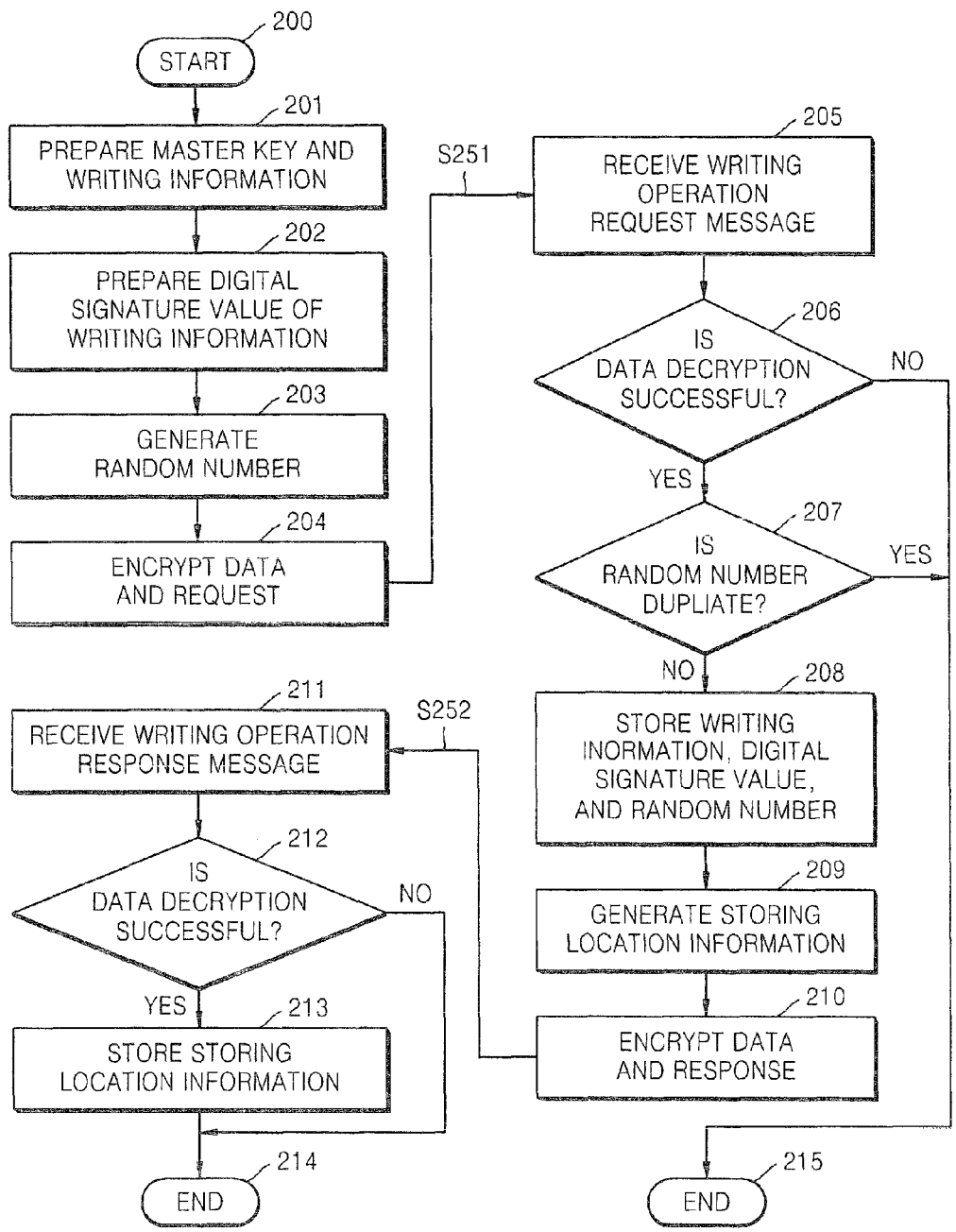
FIG. 2 is a flowchart of a data writing operation according to an embodiment of the present invention.

FIG. 2 is a flowchart of a data writing operation according to an embodiment of the present invention.

A method of protecting writing data according to the present invention will be described in more detail based on the process of FIG. 2.

In order to perform a writing operation, the RFID reader prepares writing information and a master key that is identical with the master key of a RFID tag at the same time in operation 201.

The master key can be prepared by using a method other than the communication with the RFID tag and the RFID reader. In general, for example, the master key can be prepared by recognizing an input of a user's password or from a separate key distribution server.

The RFID reader obtains a digital signature value for prepared writing information in operation 202.

The digital signature value can be produced by the RFID reader itself or can be obtained by sending the writing information to a separate digital signature server.

The RFID reader generates a random number in operation 203.

The RFID reader performs a data encryption operation according to the present invention in operation 204 by using the master key and the writing information in operation 201, the digital signature value in operation 202, the random number in operation 203, and the RFID communication protocol header information.

The RFID reader arranges the RFID communication protocol header information, the random number, the digital signature value, the encrypted writing information, and a message integrity code according to a disposition of the present invention to produce the form of a writing operation request message and transmits the message to the RFID tag in operation 251.

The RFID tag receives the writing operation request message from the RFID reader in operation 205.

The RFID tag performs a data decryption operation according to the present invention by using the master key and information included in the writing operation request message in operation 206.

The master key of the RFID tag can be stored during manufacture or can be recorded by a user.

If the data decryption operation fails, the RFID tag ignores the writing operation request message and completes all operations in operation 215.

If the data decryption operation and a message integrity code inspection succeed, the next operation is performed.

The RFID tag compares the random number included in the writing operation request message and the random number stored in the RFID tag in operation 207.

As the result of the comparison, when the same random number exists, the RFID tag ignores the writing operation request message and completes all operations in operation 215.

When the random number is not the same, the next operation is performed.

The RFID tag stores the random number included in the writing operation request message, the digital signature value, and the writing information decrypted in operation 206, in operation 208.

The RFID tag generates storing location information which informs the storing location of the values stored in operation 208, in operation 209.

The RFID tag performs a data encryption operation according to the present invention by using the master key, storing location information, the random number, and the RFID communication protocol header information in operation 210.

The RFID tag arranges the RFID communication protocol header information, the random number, the encrypted storing location information, and the message integrity code according to the disposition of the present invention to form a writing operation response message and transmits the message to the RFID reader in operation 252.

The RFID reader receives the writing operation response message from the RFID tag in operation 211.

The RFID reader performs a data decryption operation according to the present invention by using the master key and information included in the writing operation response message in operation 212.

If the data decryption operation fails, the RFID reader ignores the writing operation response message and completes all operations in operation 214.

If the data decryption operation and a message integrity code inspection succeed, the next operation is performed.

The RFID reader stores the storing location information decrypted in operation 212, in operation 213.

The RFID reader finally stores the storing location information of the RFID tag and then completes the writing operation according to the present invention in operation 214.

FIG. 3 is a diagram of a request-response packet transmitted during a data writing operation according to an embodiment of the present invention.

The form of the writing operation request message illustrated in FIG. 3 is the same as the form of the message transmitted in operation 251 illustrated in FIG. 2.

The form of the writing operation request message can be divided into a writing operation request message header 301 and a writing operation request message text 302. The writing operation request message header 301 includes a tag manufacturer ID 303, a tag serial number 304, and a reader ID 305.

The writing operation request message text 302 includes an 8 byte random number 306, a 42 byte digital signature value 307, writing information 308 encrypted by using an encryption technology according to the present invention, and an 8 byte message integrity code 309 induced from the encryption technology according to the present invention.

The form of the writing operation response message illustrated in FIG. 3 is the same as the form of the message transmitted in operation 252 illustrated in FIG. 2.

The form of the writing operation response message can be divided into a writing operation response message header 310 and a writing operation response message text 311. The writing operation response message header 310 includes a tag manufacturer ID 312, a tag serial number 313, and a reader ID 314.

The writing operation response message text 311 includes an 8 byte random number 315, 4 bytes storing location information 316 encrypted by using an encryption technology according to the present invention, and an 8 byte message integrity code 317 induced from the encryption technology according to the present invention.

Figure 4:
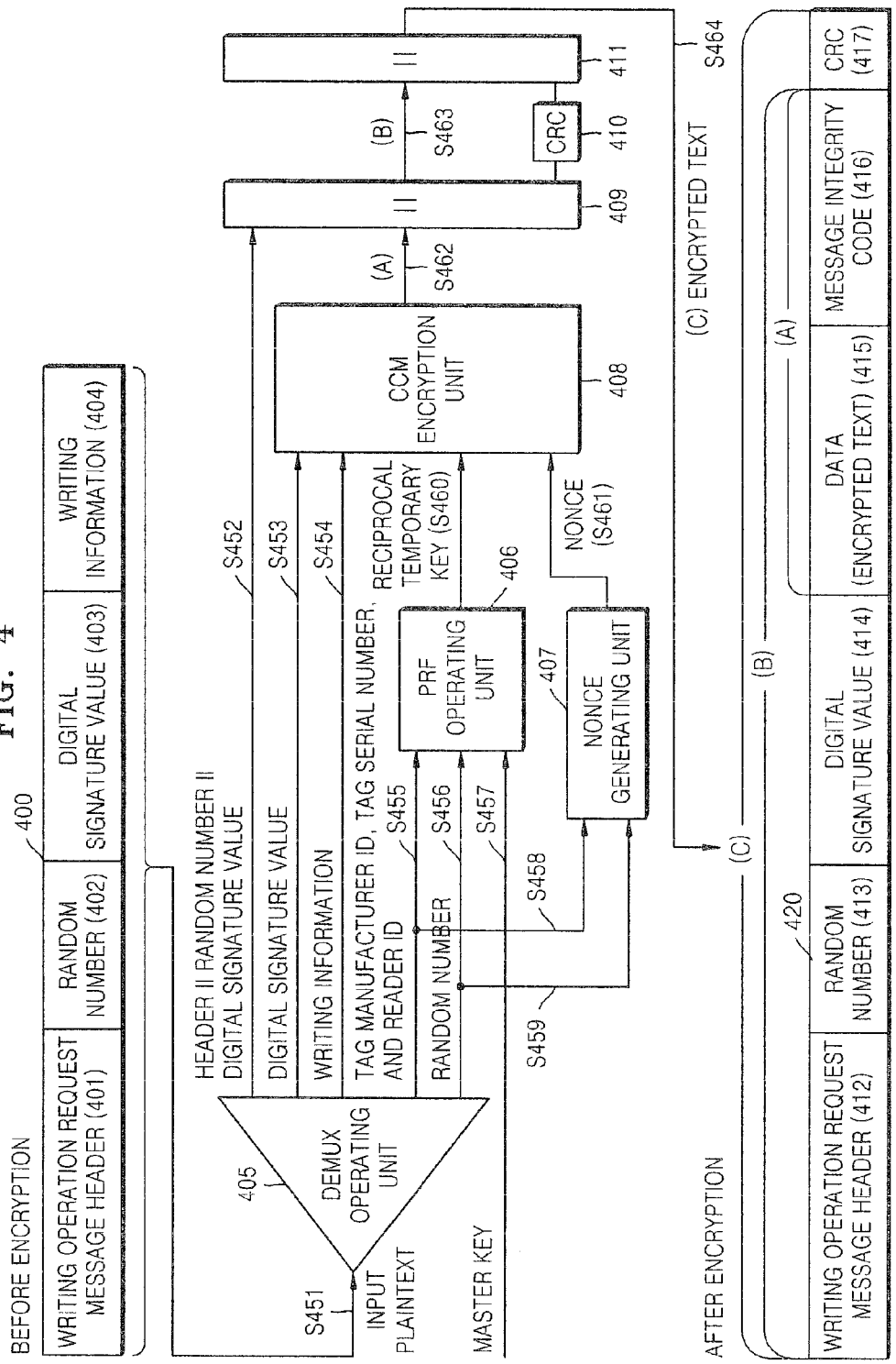
FIG. 4 is a diagram of an encryption operation of a request message transmitted during a data writing operation according to an embodiment of the present invention.

FIG. 4 is a diagram of an encryption operation of a request message transmitted during a data writing operation according to an embodiment of the present invention.

The form of a message 400 prior to the encryption illustrated in FIG. 4 is the same as the form of a message for the encryption operation prepared in the RFID reader. The forms of the message prepared are input to a Demux operating unit 405 according to an embodiment of the present invention in operation S451.

The Demux operating unit 405 sends the digital signature value and plaintext writing information to an input of a CCM encryption unit 408 in operations S453 and S454, sends the tag manufacturer ID, the tag serial number, and the reader ID to inputs of a Pseudo Random Function (PRF) operating unit 406 and a nonce generating unit 407 in operations S455 and S458, and sends the random number to inputs of the PRF operating unit 406 and the nonce generating unit 407 in operations S456 and S459.

In addition, the master key prepared in the RFID reader is entered into the input of the PRF operating unit 406 in operation S457.

The PRF operating unit 406 generates a reciprocal temporary key by using the input master key, the random number, the tag manufacturer ID, the tag serial number, and the reader ID and sends the reciprocal temporary key to the input of the CCM encryption unit 408 in operation S460.

The nonce generating unit 407 generates a nonce by using the input random number, the tag manufacturer ID, the tag serial number, and the reader ID and sends the nonce to the input of the CCM encryption unit 408 in operation S461.

The CCM encryption unit 408 performs a well known CCM encryption operation, generates the encrypted writing information and the message integrity code by using the input digital signature value, the plaintext writing information, the reciprocal temporary key, and the nonce, and sends the encrypted writing information and the message integrity code to a first concatenation block 409 in operation S462.

The first concatenation block 409 concatenates the writing operation request message header, the random number, and the digital signature value sent from the Demux operating unit 405 in operation S452 with the encrypted writing information and the message integrity code sent from the CCM encryption unit 408 to send to a second concatenation block 411 in operation S463.

A CRC code for entire data output from the concatenation block 409 is generated from a CRC block 410 and the CRC code is sent to the second concatenation block 411.

The second concatenation block 411 concatenates the data output from the first concatenation block 409 in operation S463 with the CRC code output from the CRC block 410 and produces a message 420 having a predetermined form after a final encryption to output in operation S464.

The form of the message 420 after a final encryption is the same as the form in which the CRC is added to the forms of the writing operation request message 301 and 302 and indicates the message transmitted in operation 251 in FIG. 2.

Figure 5:
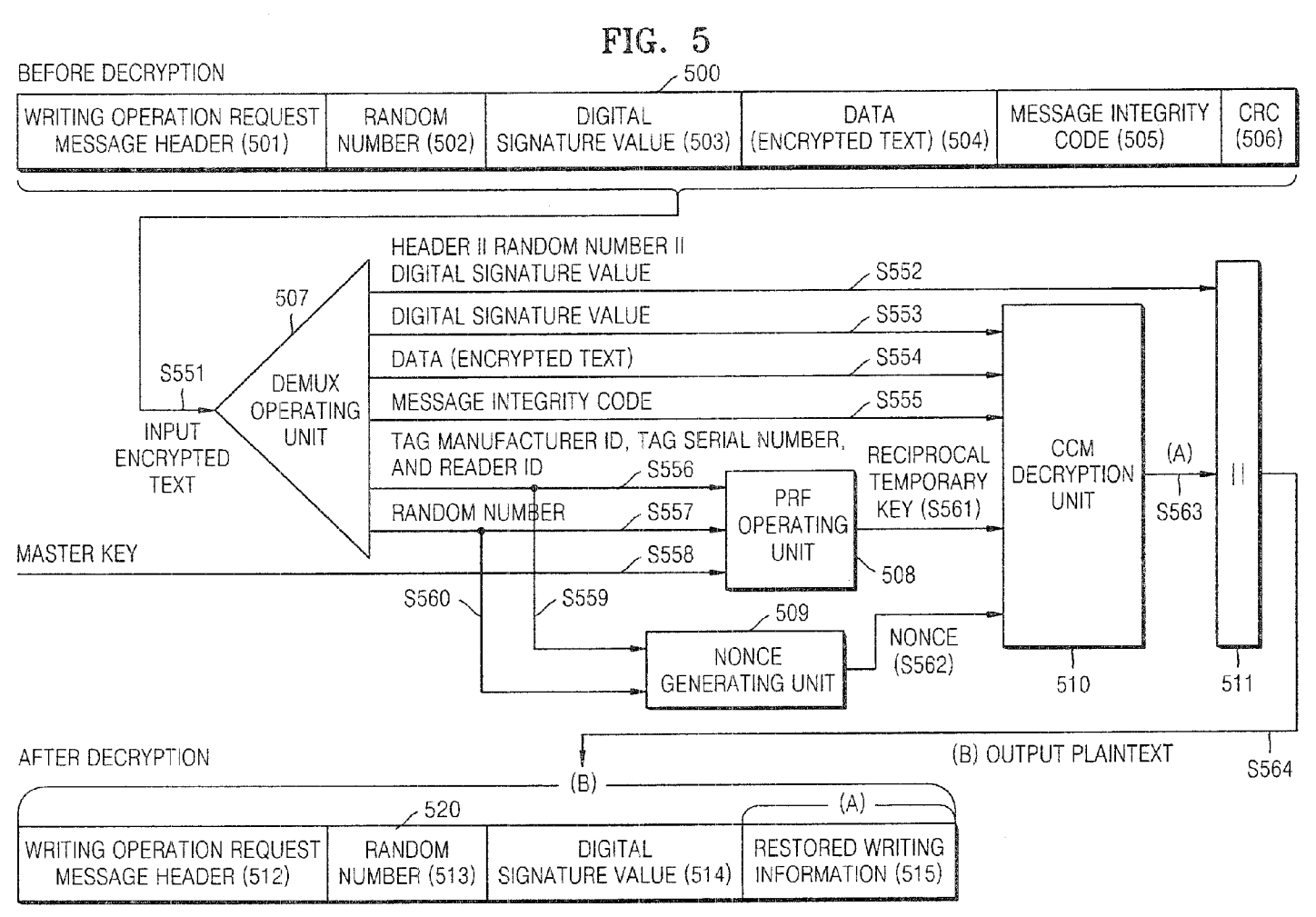

FIG. 5 is a diagram of a decryption operation of a request message transmitted during a data writing operation according to an embodiment of the present invention.

The form of a message 500 prior to the decryption illustrated in FIG. 5 is the same as the form of the writing operation request message received by the RFID tag and the message 500 is same as the message after a final encryption in operation S464 in FIG. 4 and of the message transmitted in operation 251 in FIG. 2.

The message prior to the decryption received are input to a Demux operating unit 507 according to an embodiment of the present invention in operation S551.

The Demux operating unit 507 sends a digital signature value, data that is encrypted text, and a message integrity code to an input of a CCM decryption unit 510 in operations S553, S554, and S555, sends a tag manufacturer ID, a tag serial number, and a reader ID to inputs of a PRF operating unit 508 and a nonce generating unit 509 in operations S556 and S559, and sends a random number to the inputs of the PRF operating unit 508 and the nonce generating unit 509 in operations S557 and S560.

In addition, the master key of the RFID tag enters into the input of the PRF operating unit 508 in operation S558.

The PRF operating unit 508 generates a reciprocal temporary key by using the input master key, the random number, the tag manufacturer ID, the tag serial number, and the reader ID and sends the reciprocal temporary key to the input of the CCM decryption unit 510 in operation S561.

The nonce generating unit 509 generates a nonce by using the input random number, the tag manufacturer ID, the tag serial number, and the reader ID and sends the nonce to the input of the CCM decryption unit 510 in operation S562.

The CCM decryption unit 510 performs a well known CCM decryption operation, performs data restoration and a message integrity code inspection by using the input digital signature value, data that is encrypted text, the message integrity code, the reciprocal temporary key, and the nonce, and sends writing information that is decrypted data to a concatenation block 511 in operation S563.

The concatenation block 511 concatenates the writing operation request message header, the random number, and the digital signature value sent from the Demux operating unit 507 with the decrypted writing information sent from the CCM decryption unit 510 and produces a message 512, 513, 514, and 515 having a predetermined form after a final decryption to output in operation 564.

The form of the message 520 after a final decryption is the same as the form of the writing operation request message 300 of FIG. 3 and the message 520 is the same message as the message 400 prior to the encryption of FIG. 4.

That is, in the present invention, when the writing operation request message of the RFID reader is transmitted in a wireless section, the writing operation request message has the form of the message after the encryption of FIG. 4.

Since the writing information 404 which is important and should be protected in a wireless section is encrypted while passing through the CCM encryption unit 408, the writing information 404 can be protected from an illegitimate eavesdropper.

In addition, the digital signature value 403 for the writing information 404 is transmitted from the RFID reader and is stored in the RFID tag. Accordingly, when another RFID reader reads writing information and the digital signature value from the RFID tag and performs a digital signature inspection, a non-repudiation function for the writing information stored in the RFID tag occurs.

Moreover, since the RFID reader generates the message integrity code by using the writing information 404 and the digital signature value 403 and encrypts the message integrity code by the CCM encryption unit 408, the RFID reader can verify and decrypt the message integrity code. Accordingly, when the message is damaged by a illegal attacker, the RFID tag fails in the verification and recognizes the damage of the message.

Figure 6:
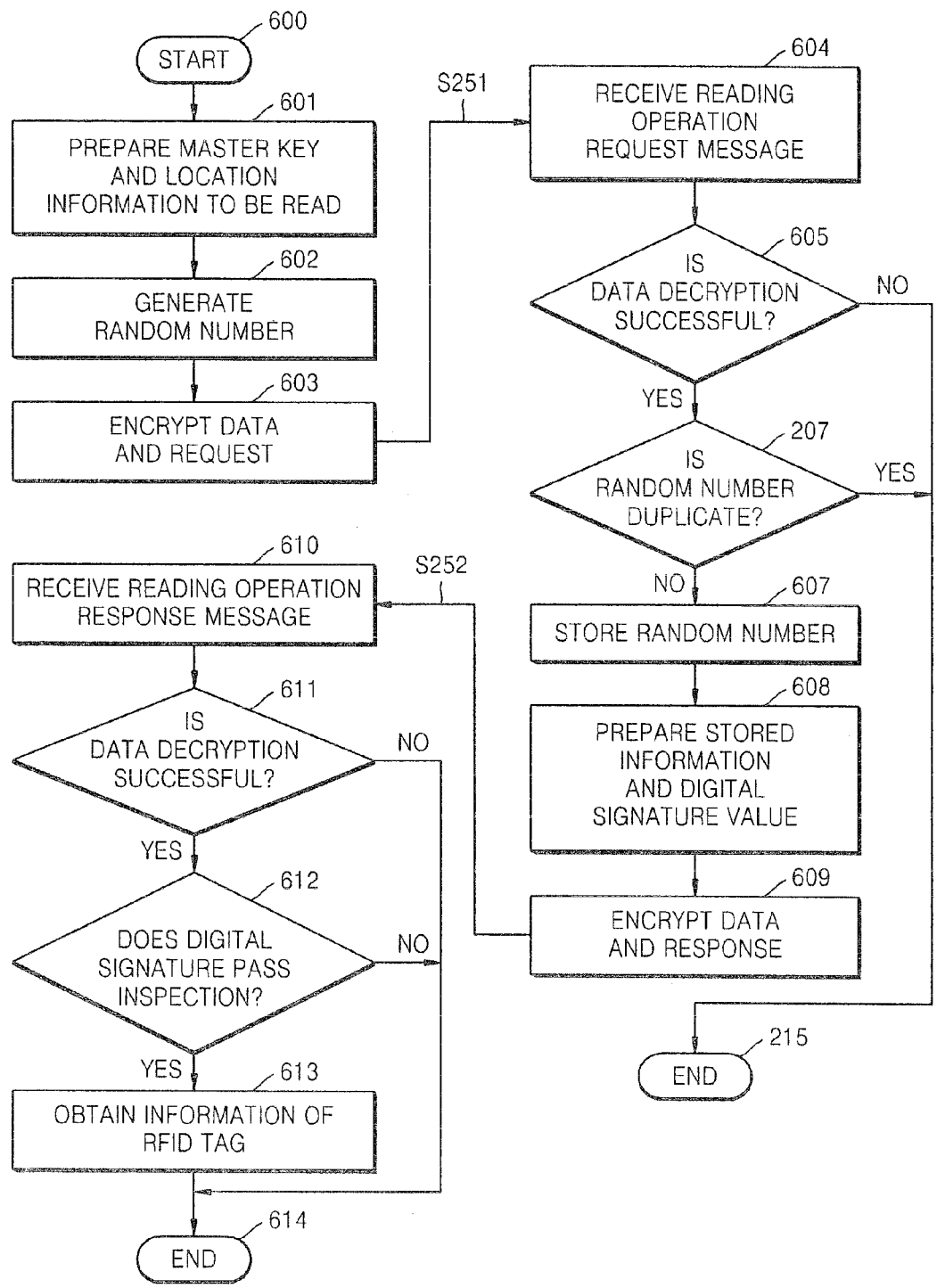
FIG. 6 is a flowchart of a data reading operation according to an embodiment of the present invention.

FIG. 6 is a flowchart of a data reading operation according to an embodiment of the present invention.

A method of protecting reading operation data according to the present invention will be described in more detail based on the process of FIG. 6.

In order to perform a reading operation, the RFID reader prepares location information of data to be read in operation 601.

If the accurate location information to be read is unknown, a magic number can be used to read all data of the RFID tag.

Simultaneously, the RFID reader prepares a master key that is identical with a key of a RFID tag.

The master key can be prepared by using a method other than the communication with the RFID tag and the RFID reader. In general, for example, the master key can be prepared by recognizing an input of a user's password or from a separate key distribution server.

The RFID reader generates a random number in operation 602.

The RFID reader performs a data encryption operation according to the present invention in operation 603 by using the master key, the location information to be read, the random number, and the RFID communication protocol header information.

The RFID reader arranges the RFID communication protocol header information, the random number, the encrypted location information to be read, and a message integrity code according to a disposition of the present invention to produce a form of a reading operation request message and transmits the message to the RFID tag in operation 651.

The RFID tag receives the reading operation request message from the RFID reader in operation 604.

The RFID tag performs a data decryption operation according to the present invention by using the master key and information included in the reading operation request message in operation 605.

The master key of the RFID tag can be stored during manufacture or can be recorded by a user.

If the data decryption operation fails, the RFID tag ignores the reading operation request message and completes all operations in operation 615.

If the data decryption operation and a message integrity code inspection succeed, the next operation is performed.

The RFID tag compares the random number included in the reading operation request message and the random number stored in the RFID tag in operation 606.

As the result of the comparison, when the random numbers are the same, the RFID tag ignores the reading operation request message and completes all operations in operation 615.

When the random numbers are not the same, the next operation is performed.

The RFID tag stores the random number included in the reading operation request message in operation 607.

The RFID tag prepares secret information and the digital signature value stored in the corresponding location according to the location information to be read that is restored in operation 607, in operation 608.

If the location information to be read that is restored in operation 605 is the previously agreed magic number, all data of the RFID tag is prepared.

The RFID tag performs a data encryption operation according to the present invention by using the master key, the secret information, the digital signature value, or all data of the RFID tag that is information prepared, the random number, and the RFID communication protocol header information in operation 609.

The RFID tag arranges the RFID communication protocol header information, the random number, the encrypted data, and the message integrity code according to the disposition of the present invention to produce a reading operation response message and transmits the message to the RFID reader in operation 652.

The RFID reader receives the reading operation response message from the RFID tag in operation 610.

The RFID reader performs a data decryption operation according to the present invention by using the master key and information included in the reading operation response message in operation 611.

If the data decryption operation fails, the RFID reader ignores the reading operation response message and completes all operations in operation 614.

If the data decryption operation and a message integrity code inspection succeed, the next operation is performed.

The RFID reader finds out the portion corresponding to the digital signature value among the data restored in operation 611 and performs a digital signature inspection in operation 612.

The digital signature inspection can be performed by the RFID reader itself or the result of the digital signature inspection can be obtained by sending the digital signature vale to a separate digital signature server.

If the digital signature inspection fails, the RFID reader ignores the reading operation response message and completes all operations in operation 614.

The RFID reader stores secret information to be obtained from among the data restored in operation 611, in operation 613.

When the restored secret information is stored, the data reading operation according to an embodiment of the present invention is completed in operation 614.

Figure 7:
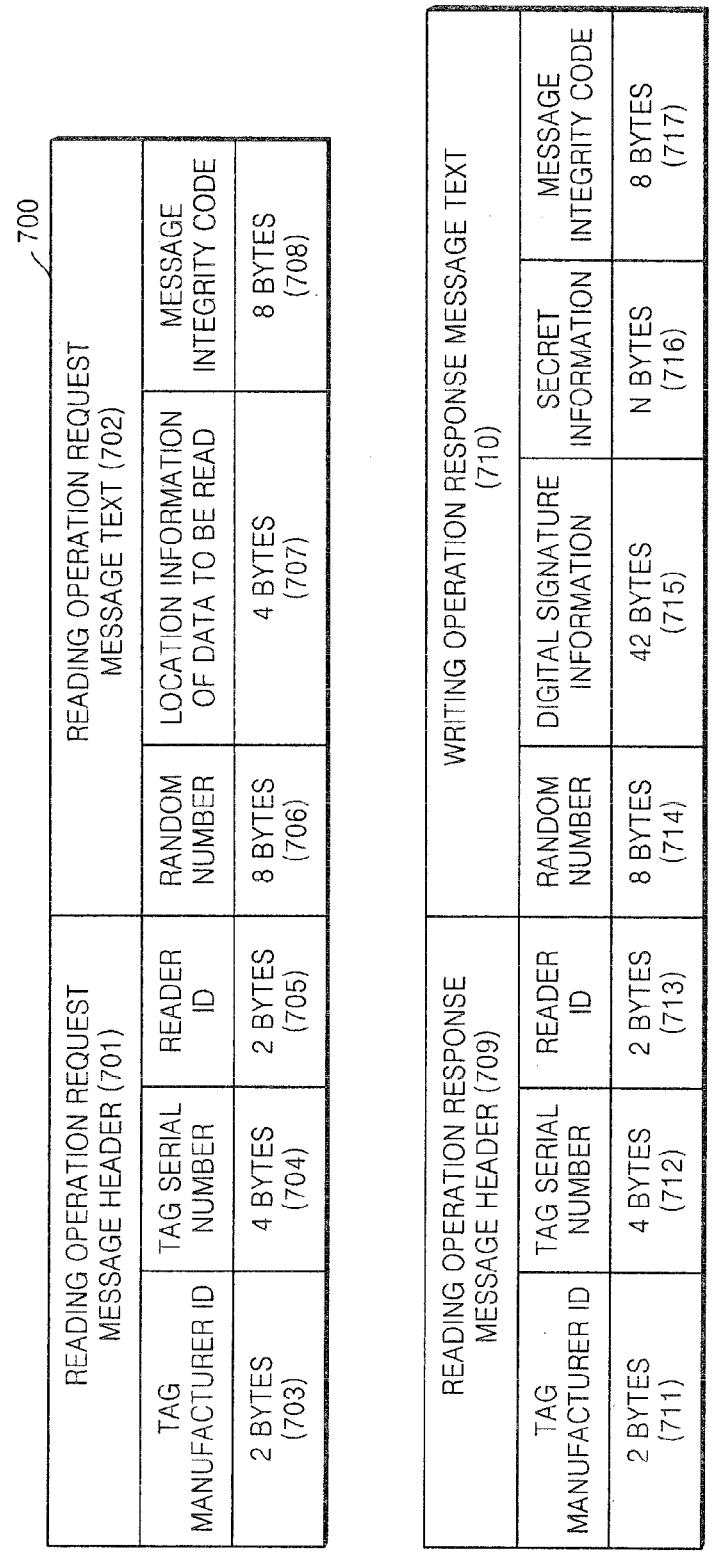
FIG. 7 is a diagram of a request-response packet transmitted during a data reading operation according to an embodiment of the present invention.

FIG. 7 is a diagram of a request-response packet transmitted during a data reading operation according to an embodiment of the present invention.

The form of the reading operation request message illustrated in FIG. 7 is the same as the form of the message transmitted in operation 651 illustrated in FIG. 6.

The form of the reading operation request message can be divided into a reading operation request message header 701 and a reading operation request message text 702. The reading operation request message header 701 includes a tag manufacturer ID 703, a tag serial number 704, and a reader ID 705.

The reading operation request message text 702 includes an 8 byte random number 706, location information 707 to be read that is encrypted by using an encryption technology according to the present invention, and an 8 byte message integrity code 708 induced from the encryption technology according to the present invention.

In addition, the form of the reading operation response message illustrated in FIG. 7 is the same as the form of the message transmitted in operation 652 illustrated in FIG. 6.

The form of the reading operation response message can be divided into a reading operation request message header 709 and a reading operation response message text 710. The reading operation response message header 709 includes a tag manufacturer ID 711, a tag serial number 712, and a reader ID 713.

The reading operation response message text 710 includes an 8 byte random number 714, a 42 byte digital signature value 715, secret information 716 encrypted by using an encryption technology according to the present invention, and an 8 byte message integrity code 717 induced from the encryption technology according to the present invention.

Figure 8:
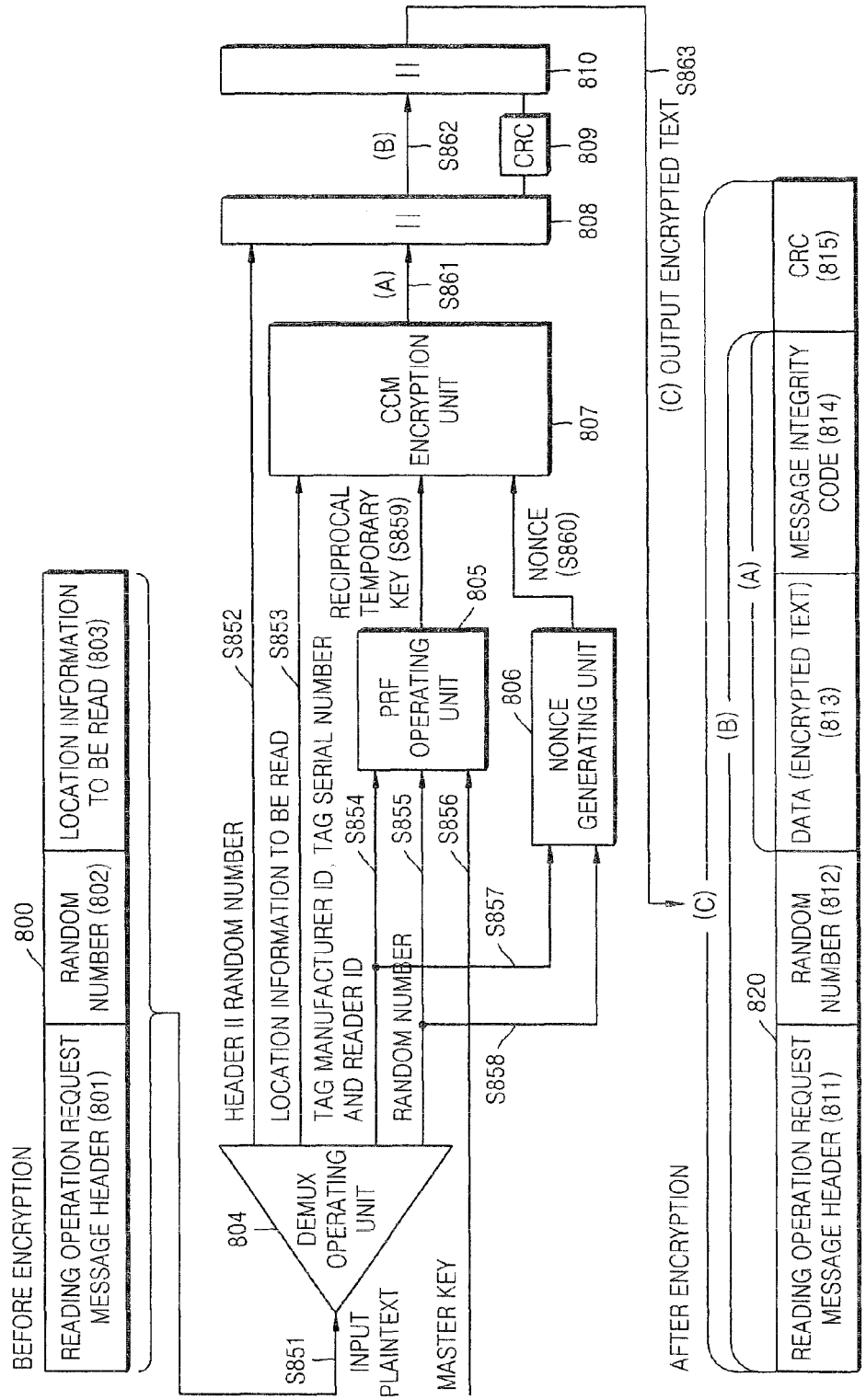
FIG. 8 is a diagram of an encryption operation of a request message transmitted during a data reading operation according to an embodiment of the present invention.

FIG. 8 is a diagram of an encryption operation of a request message transmitted during a data reading operation according to an embodiment of the present invention.

The form of a message 800 prior to the encryption illustrated in FIG. 8 is the same as the form of a message for the encryption operation prepared in the RFID reader. The message prepared in this form is input to a Demux operating unit 804 according to an embodiment of the present invention in operation 851.

The Demux operating unit 804 sends plaintext location information to be read to an input of a CCM encryption unit 807 in operation 853, sends the tag manufacturer ID, the tag serial number, and the reader ID to inputs of a Pseudo Random Function (PRF) operating unit 805 and a Nonce generating unit 806 in operations 854 and 857, and sends the random number to inputs of the PRF operating unit 805 and the nonce generating unit 806 in operations 855 and 858.

In addition, the master key prepared in the RFID reader enters into the input of the PRF operating unit 805 in operation 856.

The PRF operating unit 805 generates a reciprocal temporary key by using the input master key, the random number, the tag manufacturer ID, the tag serial number, and the reader ID and sends the reciprocal temporary key to the input of the CCM encryption unit 807 in operation 859.

The nonce generating unit 806 generates a nonce by using the input random number, the tag manufacturer ID, the tag serial number, and the reader ID and sends the nonce to the input of the CCM encryption unit 807 in operation 860.

The CCM encryption unit 807 performs a well known CCM encryption operation, generates the encrypted reading information and the message integrity code by using the input plaintext location information to be read, the reciprocal temporary key, and the nonce, and sends the encrypted reading information and the message integrity code to a first concatenation block 808 in operation 861.

The first concatenation block 808 concatenates the reading operation request message header and the random number sent from the Demux operating unit 804 in operation 852 with the encrypted reading information and the message integrity code sent from the CCM encryption unit 807 to send to a second concatenation block 810 in operation 809.

The second concatenation block 810 concatenates the data output from the first concatenation block 808 in operation 862 with a CRC code output from a CRC block 809 and produces a message 820 in a predetermined form after a final encryption to output in operation 863.

The form of the message 820 after a final encryption is the same as the form in which the CRC is added to the reading operation request message 700 and indicates the message transmitted in operation 651 in FIG. 6.

FIG. 9 is a diagram of a decryption operation of a request message transmitted during a data reading operation according to an embodiment of the present invention.

The form of a message 900 prior to the decryption illustrated in FIG. 9 is the same as the form of the reading operation request message received by the RFID tag and the message 900 is the same as the message after a final encryption in operation 863 in FIG. 8 and the message transmitted in operation 651 in FIG. 6.

The message prior to the decryption received are input to a Demux operating unit 906 according to an embodiment of the present invention in operation 951.

The Demux operating unit 906 sends data that is encrypted text and a message integrity code to an input of a CCM decryption unit 909 in operations 953 and 954, sends a tag manufacturer ID, a tag serial number, and a reader ID to inputs of a PRF operating unit 907 and a nonce generating unit 908 in operations 955 and 958, and sends a random number to the inputs of the PRF operating unit 907 and the nonce generating unit 908 in operations 956 and 959.

In addition, the master key of the RFID tag enters into the input of the PRF operating unit 907 in operation 957.

The PRF operating unit 907 generates a reciprocal temporary key by using the input master key, the random number, the tag manufacturer ID, the tag serial number, and the reader ID and sends the reciprocal temporary key to the input of the CCM decryption unit 909 in operation 960.

The nonce generating unit 908 generates a nonce by using the input random number, the tag manufacturer ID, the tag serial number, and the reader ID and sends the nonce to the input of the CCM decryption unit 909 in operation 961.

The CCM decryption unit 909 performs a well known CCM decryption operation, performs data restoration and a message integrity code inspection by using the input data that is an encrypted text, the message integrity code, the reciprocal temporary key, and the nonce, and sends location information to be read that is decrypted data to a concatenation block 910 in operation 962.

The concatenation block 910 concatenates the reading operation request message header and the random number sent from the Demux operating unit 906 with the restored location information to be read sent from the CCM decryption unit 909 and produces a message 911, 912, and 913 in a predetermined form after a final decryption to output in operation 963.

The form of the message 920 after a final decryption is the same as the form of the writing operation request message 700 of FIG. 7 and the message 920 after a final decryption is the same message as the message 800 prior to the encryption of FIG. 8.

The invention can also be embodied as computer readable codes on a computer readable recording medium. The computer readable recording medium is any data storage device that can store data which can be thereafter read by a computer system. Examples of the computer readable recording medium include read-only-memory (ROM), random-access memory (RAM), CD-ROMs, magnetic tapes, floppy disks, optical data storage devices, and carrier waves (such as data transmission through the Internet). The computer readable recording medium can also be distributed over network coupled computer system so that the computer readable code is stored and executed in a distributed fashion.

As described above, the apparatus and method for protecting radio frequency RFID data conform to the RFID international standard and protect data communicated between the RFID reader and the RFID tag.

The effects of the apparatus and method for protecting radio frequency RFID data can be outlined as follows.

First, information output to the wireless section in the apparatus and method for protecting radio frequency RFID data is encrypted by using an encryption technology according to the present invention. Thus, an illegitimate eavesdropper can not obtain plaintext data from the wireless section so that data of the RFID tag can be protected.

Second, information output to the wireless section in the apparatus and method for protecting radio frequency RFID data is an encrypted text encrypted by using an encryption technology according to the present invention. Thus, the encrypted text can be decoded by the RFID reader and the RFID tag which include the same master key. Since only when the RFID tag includes an appropriate master key, the RFID tag can decode a request message sent from the RFID reader and respond thereto. Thus, the RFID reader and the RFID tag can mutually obtain authentication.

Third, in the apparatus and method for protecting radio frequency RFID data, the RFID reader performs a digital signature for writing information to be stored in the RFID tag and stores the writing information. Thus, when another RFID reader reads information stored in the RFID tag, a digital signature is inspected so that reliability of stored information can be identified.

Finally, in the apparatus and method for protecting radio frequency RFID data, each of a data writing operation and a data reading operation includes one request and one response which is compatible with the RFID international standard. Thus, a data protection service can be provided by a operation that is suitable for the international standard RFID system.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of protecting radio frequency identification (RFID) data comprising:
    receiving a message header formed of serial bit strings, a random number, and data and outputting the message header, the random number, and the data by dividing the message header, the random number, and the data into predetermined bit lengths;
    using random number, encrypting or decrypting the data with a CCM decryption device and generating or inspecting a message integrity code in order to check an error occurrence in the encrypted or decrypted data; and
    concatenating the encrypted or decrypted data with the message header, the random number, and the message integrity code to output the encrypted or decrypted data, the message header, the random number, and the data as serial bit strings.

2. The method of claim 1, wherein the message header is at least one of information requesting a writing operation or a reading operation and information responding to a writing operation or a reading operation.

3. The method of claim 1, wherein the encrypting or decrypting of the data comprises:
    generating a pseudo random number comprising a tag manufacturer ID, a tag serial number, a reader ID, and the random number; and
    encrypting the data by using the generated pseudo random number.

4. The method of claim 2, wherein when the message header is information requesting the writing operation or information responding to the reading operation, the receiving bit strings and the outputting bit strings further comprise a digital signature value having a predetermined bit length.

5. The method of claim 2, wherein the encrypting or decrypting the data comprises:
    generating a pseudorandom comprising a tag manufacturer ID, a tag serial number, a reader ID, and the random number; and
    decrypting the encrypted data by using the generated pseudo random number.

6. The method of claim 2, when the message header is information requesting the writing operation or information responding to the reading operation, further comprising:
    allowing a RFID reader to prepare writing information and a master key;
    obtaining a digital signature value of the prepared writing information;
    generating the random number;
    performing an encryption operation on the writing information by using the master key, the digital signature value, the random number and the message header information requesting the writing operation;
    connecting the message header information requesting the writing operation, the random number, the digital signature value, the encrypted writing information, and the message integrity code with serial bit strings to generate and transmit a writing operation request message;
    allowing a RFID tag to receive the writing operation request message transmitted from the RFID reader;
    decrypting the encrypted writing information by using the master key, the message header information requesting the writing operation, the random number, the digital signature value;
    comparing the random number included in the writing operation request message with the random number stored in the RFID tag;
    storing the random number included in the writing operation request message, the digital signature value, and the restored writing information;
    generating location information in which the writing information is stored;
    performing an encryption operation for the storing location information by using the message header information responding to the writing operation, the master key, the random number, and the storing location information;
    connecting the message header information responding to the writing operation, the master key, the encrypted storing location information, and the message integrity code with serial bit strings to generate and transmit a writing operation response message;
    allowing the RFID reader to receive the writing operation response message from the RFID tag;
    decrypting the encrypted storing location information by using the master key, message header information responding to the writing operation, and the random number; and
    storing the storing location information decrypted in the previous step.

7. The method of claim 6, wherein the performing an encryption operation on the writing information comprises:
    dividing the master key, the digital signature value, the random number, the message header requesting the writing operation into predetermined bit lengths to be output;
    generating a reciprocal temporary key by using the master key, the random number, the tag manufacturer ID, the tag serial number, and the reader ID;
    generating a nonce by using the random number, the tag manufacturer ID, the tag serial number, and the reader ID; and generating the encrypted writing information and the message integrity code by using the digital signature value, the reciprocal temporary key, and the nonce.

8. The method of claim 6, wherein the generating of the writing operation request message comprises:
connecting the message header information requesting the writing operation, the random number, the digital signature value, the encrypted writing information, and the message integrity code;
generating a Cyclic Redundancy Check (CRC) code; and
connecting the CRC code to generate the writing operation request message.

9. The method of claim 6, wherein the decrypting the encrypted writing information comprises:
dividing the message header information requesting the writing operation, the digital signature value, the random number, and the encrypted writing information formed of the writing operation request message into predetermined bit lengths to be output;
generating a reciprocal temporary key by using the master key, the random number, the tag manufacturer ID, the tag serial number, and the reader ID;
generating a nonce by using the random number, the tag manufacturer ID, the tag serial number, and the reader ID; and
decrypting the encrypted writing information by using the digital signature value, the reciprocal temporary key, and the nonce and performing an message integrity code inspection.

10. The method of claim 6, wherein in the comparing of the random number, when the random number is same as the random number stored in the RFID tag, the writing operation request message is disused.

11. The method of claim 2, when the message header is information requesting the reading operation or information responding to the reading operation, further comprising:
allowing a RFID reader to prepare location information to be read and a master key;
generating the random number;
performing an encryption operation on the location information to be read by using the master key, the random number and the message header information requesting the reading operation;
connecting the message header information requesting the reading operation, the random number, the encrypted location information to be read, and the message integrity code with serial bit strings to generate and transmit a reading operation request message;
allowing a RFID tag to receive the reading operation request message transmitted from the RFID reader;
decrypting the encrypted reading information by using the master key, the message header information requesting the reading operation, and the random number;
comparing the random number with the random number stored in the RFID tag;
storing the random number included in the reading operation request message;
preparing information stored in the corresponding location based on the location information to be read that is decrypted and a digital signature value;
performing an encryption operation on the location information to be read by using the master key, the digital signature vale, the tag manufacturer ID, the tag serial number, the random number, and the message header information responding to the reading operation;
connecting the message header information responding to the reading operation, the random number, the master key, the digital signature value, the encrypted location information to be read, and the message integrity code with serial bit strings to generate and transmit a reading operation response message;
allowing the RFID reader to receive the reading operation response message from the RFID tag;
decrypting the encrypted location information to be read by using the master key, message header information responding to the reading operation, the random number, and the digital signature value;
performing a digital signature inspection for the digital signature value restored; and
storing the location information to be read that is restored.

12. The method of claim 11, in order to specify the location information to be read, a predetermined magic number is reciprocally exchanged between the RFID reader and the RFID tag.

13. The method of claim 11, wherein the performing an encryption operation on the location information comprises:
dividing the random number, the message header information requesting the reading operation, and the location information to be read into predetermined bit lengths to be output;
generating a reciprocal temporary key by using the master key, the random number, the tag manufacturer ID, the tag serial number, and the reader ID;
generating a nonce by using the random number, the tag manufacturer ID, the tag serial number, and the reader ID; and
generating the encrypted location information to be read and the message integrity code by using the reciprocal temporary key and the nonce.

14. The method of claim 11, wherein the generating the reading operation request message comprises:
connecting the message header information requesting the reading operation, the random number, the location information to be read encrypted in the performing an encryption operation, and the message integrity code;
generating a CRC code;
connecting the CRC code to generate the reading operation request message.

15. The method of claim 11, wherein the decrypting the encrypted reading information comprises:
dividing the message header information requesting the reading operation, the random number, and the encrypted location information to be read that are formed of the reading operation request message into predetermined bit lengths to be output;
generating a reciprocal temporary key by using the master key, the random number, the tag manufacturer ID, the tag serial number, and the reader ID;
generating a nonce by using the random number, the tag manufacturer ID, the tag serial number, and the reader ID; and
decrypting the encrypted location information to be read by using the message integrity code, the reciprocal temporary key, and the nonce and performing an message integrity code inspection.

16. The method of claim 11, wherein in the comparing of the random number, when the random number included in the reading operation request message is the same as the random number stored in the RFID tag, the reading operation request message is terminated.

17. The method of claim 11, when the restored information is a predetermined magic number that is reciprocally exchanged, the tag manufacturer ID and the tag serial number are prepared.

* * * * *